(12) United States Patent
Kutsin

(10) Patent No.: US 8,246,700 B1
(45) Date of Patent: Aug. 21, 2012

(54) METHOD AND SYSTEM FOR RECYCLING FLUE GAS

(76) Inventor: Leonid Kutsin, North Tonawanda, NY (US)

( * ) Notice: Subject to any disclaimer, the term of this patent is extended or adjusted under 35 U.S.C. 154(b) by 747 days.

(21) Appl. No.: 12/315,928

(22) Filed: Dec. 8, 2008

Related U.S. Application Data

(60) Provisional application No. 61/005,538, filed on Dec. 6, 2007.

(51) Int. Cl.
*C01B 3/36* (2006.01)
*C01B 6/24* (2006.01)
*C01B 3/02* (2006.01)
*C10J 3/00* (2006.01)
*B01J 7/00* (2006.01)

(52) U.S. Cl. ............ 48/197 R; 48/61; 48/210; 423/644; 423/648.1

(58) Field of Classification Search ................. 48/197 R, 48/61
See application file for complete search history.

(56) References Cited

U.S. PATENT DOCUMENTS

| | | | |
|---|---|---|---|
| 5,134,944 A | 8/1992 | Keller et al. | |
| 6,401,633 B2 | 6/2002 | Baudhuin | |
| 6,843,814 B1 | 1/2005 | Schingnitz et al. | |
| 6,877,322 B2 | 4/2005 | Fan | |
| 6,992,113 B2 | 1/2006 | O'Rear et al. | |
| 6,992,114 B2 | 1/2006 | O'Rear et al. | |
| 7,066,984 B2 | 6/2006 | Dunn | |
| 7,247,293 B2 | 7/2007 | Sorace | |
| 7,309,378 B2 | 12/2007 | Bancon et al. | |
| 7,375,142 B2 | 5/2008 | Pearson | |
| 2002/0113228 A1* | 8/2002 | Kim et al. ..................... | 252/373 |
| 2006/0265954 A1* | 11/2006 | Dogru et al. ................ | 48/197 R |

FOREIGN PATENT DOCUMENTS

KR   1020060103736 A   *   4/2006
WO   WO 9937739 A1   *   7/1999

\* cited by examiner

*Primary Examiner* — Matthew Merkling
(74) *Attorney, Agent, or Firm* — Montgomery Patent & Design, LLC; Robert C. Montgomery; Joseph Yaksich

(57) ABSTRACT

An improved process to reduce emissions converts carbon dioxide from the flue gas exhaust from heat or power generators, into synthetic gas which is in-turn reintroduced back into the generator as fuel, is herein disclosed. Hot flue and exhaust gases from power generators, which contain carbon dioxide, would be blown into a gasification reactor, which contains coal, wood chips or other carbon based fuels substances. The process utilizes gasification technology to create a thermochemical reaction between the carbon dioxide and the fuel via a high temperature and no-oxygen atmosphere to produce synthetic gas. The synthetic gas includes carbon monoxide and hydrogen which is then fed back into a heat or power generator as fuel. The process may include two (2) or more reactors, thereby allowing one (1) reactor to be loaded or unloaded while synthetic gas continues to be produced by the other reactor. The synthetic gas may also be further converted into vehicle fuels and other useful chemicals.

13 Claims, 3 Drawing Sheets

METHOD AND SYSTEM FOR RECYCLING FLUE GAS

RELATED APPLICATIONS

The present invention was first described in U.S. Provisional Patent Application No. 61/005,538 filed on Dec. 6, 2007, the entire disclosures of which are incorporated herein by reference.

FIELD OF THE INVENTION

The present invention relates to an improved process for utilization of carbon dioxide and heat of flue and exhaust gas, particularly from heat and power generators by a thermochemical conversion of carbon dioxide into ecologically manageable synthetic gas without pollution during said process.

BACKGROUND OF THE INVENTION

The "going green" movement is one that has picked up tremendous momentum in the United States. From energy and water conservation, to recycling, to buying organic foods and even clothing, people are more earth-conscious than ever. One (1) of the most popular means of going green involves reducing fossil fuel consumption. As available supplies dwindle, it is apparent that there is a need for a system to converting carbon dioxide from heat and power generators into synthetic gas without producing greenhouse gas emissions during the transformation.

When petroleum and natural gas were very expensive, it is a necessity to use biomass, coal and other carbonaceous source as fuel. Coal gasification processes are reasonably efficient and were used for many years to manufacture illuminating gas (coal gas) for gas lighting.

Gasification comprises burning of a feedstock in a reactor at a temperature in the range of eight hundred to fifteen hundred degrees Celsius (800-1500° C.) in the presence of air, or oxygen and water. Synthesis gas is obtained by reaction between carbon dioxide, which produced by combustion of feedstock to more than five hundred fifty degrees Celsius (550° C.) carbonaceous substances. Synthetic gas has a heating value from 10500 to 14600-16700 kJ/m3 (under normal conditions). This gas is a mixture of carbon monoxide and hydrogen; mixtures of methane with other hydrocarbons are possible. Like direct combustion, gasification is a high-temperature thermochemical conversion process, but the desired result in this case is the production of a combustible gas instead of heat. This is achieved through the partial combustion of the feedstock in restricted supply of air or oxygen, usually in a high temperature environment. The product of gasification—synthetic gas—can, after appropriate treatment, be burned directly for cooking or heat supply, or it can be used in secondary conversion technologies such as gas turbines and engines for producing electricity or mechanic work.

Synthetic gas is the name given to gases of varying composition that are generated the gasification reactor or some types of waste-to-energy gasification facilities. Synthetic gas is also used as an intermediate in producing synthetic petroleum for use as a fuel or lubricant via Fischer-Tropsch synthesis.

Synthetic gas consists primarily of carbon monoxide and hydrogen, and has less than half the energy density of natural gas. Synthetic gas is combustible and often used as a fuel source or as an intermediate in the production of other chemicals. Synthetic gas for use as a fuel is most often produced by gasification of coal or municipal waste. As an intermediate in the large-scale, industrial synthesis of hydrogen and ammonia, it is also produced from natural gas. The synthetic gas produced in large waste-to-energy gasification facilities is used as fuel to generate electricity.

Gasification is a thermochemical process that generates a gaseous, fuel rich product. Regardless of how the gasification reactor is designed, two (2) processes must take place in order to produce a useable fuel gas. In the first stage, pyrolysis releases the volatile components of the fuel at temperatures below six hundred degrees Celsius (600° C.) (1112° F.). The by-product of pyrolysis that is not vaporized is called char and comprises mainly of fixed carbon and ash. In the second gasification stage, the carbon remaining after pyrolysis is either reacted with steam or hydrogen or combusted with air or pure oxygen. Gasification with air results in a nitrogen-rich, low BTU-fuel gas. Gasification with pure oxygen results in a higher quality mixture of carbon monoxide and hydrogen and virtually no nitrogen. Gasification with steam is more commonly called "reforming" and results in a hydrogen and carbon dioxide rich "synthetic" gas. Typically, the exothermic reaction between carbon and oxygen provides the heat energy required to drive the pyrolysis and char gasification reactions.

The basic gasification reactions that must be considered are:

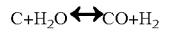

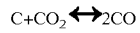

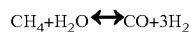

All of these reactions are reversible and their rates depend on the temperature, pressure and a concentration of oxygen in the gasification reactor.

If carbon dioxide ($CO_2$) passes a layer of feedstock by five hundred fifty degrees Celsius (550° C.) and higher, $CO_2$ converts into carbon monoxide (CO). By this reaction ($CO_2$+C=CO+CO) from two (2) molar volumes of carbon dioxide make four (4) molar volumes of carbon monoxide and, on the contrary, when carbon monoxide combusts in the reaction with oxidant from two (2) molar volumes of carbon monoxide makes one (1) molar volumes of carbon dioxide.

The basis of the formation of synthetic gas is a process that air is introduced to a lower layer of heated carbonaceous feedstock and creates carbon dioxide $CO_2$ and produces heat adequate for heating the feedstock and $CO_2$. Subsequently, by interaction in upper layers without oxygen the carbon dioxide and heat produces carbon monoxide. The reaction moved forward due to absorption of heat.

The design and operating parameters of the gasification reactor promise low level particulate emissions. Feed stocks containing up to fifty-five percent (55%) moisture have been successfully converted to clean hot gas. The low particulate emission plus the generally lower inorganic content of biomass fuels translates into reduced emission of particulate air toxic materials. Due to the precise control of the gasification and combustion zone conditions and temperatures, pollutant by-products of combustion reactions such as $NO_x$ emissions may be lower than in conventional boilers even when fuel with a higher fixed nitrogen are used. The air intake is at the bottom and the synthetic gas leaves at the top. Near the grate at the bottom the combustion reaction occurs, and the synthetic gas ins produced by reduction somewhat higher up in the gasification reactor. In the upper part of a gasification reactor, heating and pyrolysis of the feedstock occurs as a result of heat transfer by convention and radiation from the lower zones. The tars and volatiles produced during this process will be carried in the gas stream. Ashes are removed from the bottom of the reactor.

The product gases from gasification can be used for energy production, fuels, or chemical production. A separate combustion chamber outside the gasification chambers is often used for energy production. The thermal energy resulting from the combustion of gaseous products can be used in a variety of ways. These include the production of steam for generating electricity and thermal energy for the production of heat, which can then be used to bolster the reaction within the gasification reactor.

An important component of any gasification combustion process is the after-treatment equipment used to clean the effluent gases. Although gaseous products can typically be combusted more efficiently than solid materials, advanced emission control systems would still be required to meet regulatory standards. Typical exhaust or flue gas control strategies for combustion processes include particulate filters or bag houses, wet scrubber techniques, or electrostatic precipitators. The post-processing of solid like char, and ash from gasification, is another important process step. Similarly, the char, or solid carbonaceous portion of the residue, can either be utilized as a fuel for the process or sold as a carbon-rich material for the manufacture of activated carbon or for other similar industrial purposes. The reintroduction or use of char as a fuel source in the process is an important element in the process design for many of the technologies surveyed. The inert ash in the gasification residual is generally not reintroduced into the process; however, the ash may be incorporated in many technologies. This could include water wash/ quenching, screening, and the removal of metals. In some technologies, a vitrification step is also included whereby the ash is heated to a temperature above the fusion point of sand, which can then incorporate the soluble components of the ash to produce an impervious residual slag that can inhibit leaching of the ash components into ground water when buried.

The basic sources of carbon dioxide are power and heat generators: engine, turbine, and other equipments. A typical coal plant has an efficiency in the low thirty percent (30%) range, meaning sixty-five (65%) or more of the energy is wasted. Seventy percent (70%) of the nation's energy is rejected to the atmosphere as waste energy. More than forty percent (40%) of energy rejected to atmosphere with exhaust gas from mobile generators. It is often difficult to find useful application for large quantities of heat, so the heat is qualified as waste heat and is rejected to the environment. Economically most convenient is the applying of such heat to a gasification process; it is a huge resource of energy, which can be used for converting carbon dioxide into synthetic gas. The results of operation for utilizing waste heat in order to improve the efficiency and to heat feedstocks on the basis of environmentally friendly technologies are considered.

SUMMARY OF THE INVENTION

In light of the disadvantages, as previously described in the prior art, it is apparent that there is a need for a system to utilize carbon dioxide and heat from flue or exhaust gas produce an economical and ecologically desirable synthetic gas.

An object of the method and system to utilize carbon dioxide and heat from flue or exhaust gas is a method for converting carbon dioxide from heat and power generators into synthetic gas without producing greenhouse gas emissions during the transformation.

Another object of the method and system to utilize carbon dioxide and heat from flue or exhaust gas is to use the high level energy contained within the synthetic gas for increasing reaction rates and minimizing required amounts of feedstock fuel when introduced into a power/heat generator or alternately introduced into a secondary reactor.

A further object of the method and system to utilize carbon dioxide and heat from flue or exhaust gas is to reduce dependence on fossil fuels.

Still another object of the method and system to utilize carbon dioxide and heat from flue or exhaust gas is to combat global warning by reducing harmful emissions that affect the ozone layer.

Still a further object of the method and system to utilize carbon dioxide and heat from flue or exhaust gas is to refine corrosive ash elements.

Yet another object of the method and system to utilize carbon dioxide and heat from flue or exhaust gas is to provide compatibility with existing equipment and requiring a small capital investment.

Yet a further object of the method and system to utilize carbon dioxide and heat from flue or exhaust gas is to provide a proprietary shape of the reactor that produces negligible entrained particulate matter and promotes mixing of volatilized combustibles.

Yet still another aspect of the method and system to utilize carbon dioxide and heat from flue or exhaust gas is to provide a residence time for biomass fuels within the reactor that can be precisely controlled.

Yet still a further aspect of the method and system to utilize carbon dioxide and heat from flue or exhaust gas is to comprise a reactor that produces provides low levels of particulate emissions and lower inorganic content of biomass fuels which results in reduced emission of toxic materials and thermal energy.

An object of the method and system to utilize carbon dioxide and heat from flue or exhaust gas is to comprise a reactor, a loading hatch, a drying zone, a process chamber, a distillation zone, a reduction zone, a hearth zone, a grate, a cyclone, a charcoal filter, an oil filter, a condensate accumulator, a fan, a power heat generator, an oxygen flow regulator, a choke valve, a synthetic gas regulator, and a bypass gas line.

Another object of the method and system to utilize carbon dioxide and heat from flue or exhaust gas is to comprise two (2) primary zones of the process which are the combustion zones in a power/heat generator and the thermochemical reaction zone within the gasification reactor, which are integrated in combination therewith one another to recycle carbon dioxide into synthetic gas. The gasification reactor converts carbon dioxide from flue or exhaust gases into synthetic gas by cracking and reforming the feedstock fuel.

A further object of the method and system to utilize carbon dioxide and heat from flue or exhaust gas is to comprise a bypass gas line that routs synthetic gas flow to the hearth zone, producing additional synthetic gas combustion within said hearth zone to increase a balance of energy. The bypass gas line comprises a choke valve providing a flow control means to said synthetic gas.

Still a further object of the method and system to utilize carbon dioxide and heat from flue or exhaust gas is to comprise a gasification reactor comprising a cylindrical vessel further comprising output plumbing providing a connecting means thereto a gas cleaning system comprising a cyclone. The reactor further comprises a feedstock fuel loading hatch that comprises a hermetic seal. The reactor also comprises a damper-type oxygen flow regulator that is hermetically sealed during operation of the reactor.

Still another aspect of the method and system to utilize carbon dioxide and heat from flue or exhaust gas is to comprise a gasification reactor comprising several zones including a drying zone, a process chamber, a distillation zone, a reduction zone, a hearth zone, a grate, and an ash bin.

Yet another aspect of the method and system to utilize carbon dioxide and heat from flue or exhaust gas is to comprise a gas cleaning system further comprising a charcoal filter, an oil filter, and a condensate accumulator.

Yet a further aspect of the method and system to utilize carbon dioxide from flue or exhaust gas is to comprise a fan and a synthetic gas regulator to control a volumetric flow of said synthetic gas flow.

An aspect of the method and system to utilize carbon dioxide from flue and exhaust gas, in an alternate embodiment is to comprise a secondary reactor to guarantee a continuous and steady flow of synthetic gas to a power generator to maintain said gasification process.

A method of utilizing the system may be achieved by performing the following steps: starting a thermochemical reaction within a gasification reactor by loading an appropriate volume of coal or other biomass fuel; introducing hot flue or exhaust gases from a heat or power generator being oxygen poor and $CO_2$ rich and having a temperature range above five-hundred fifty (550) degrees Celsius said reactor to produce a synthetic gas; utilizing the high level energy contained within the synthetic gas to increase reaction rates and minimize required amounts of feedstock normally consumed by a conventional power/heat generator.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
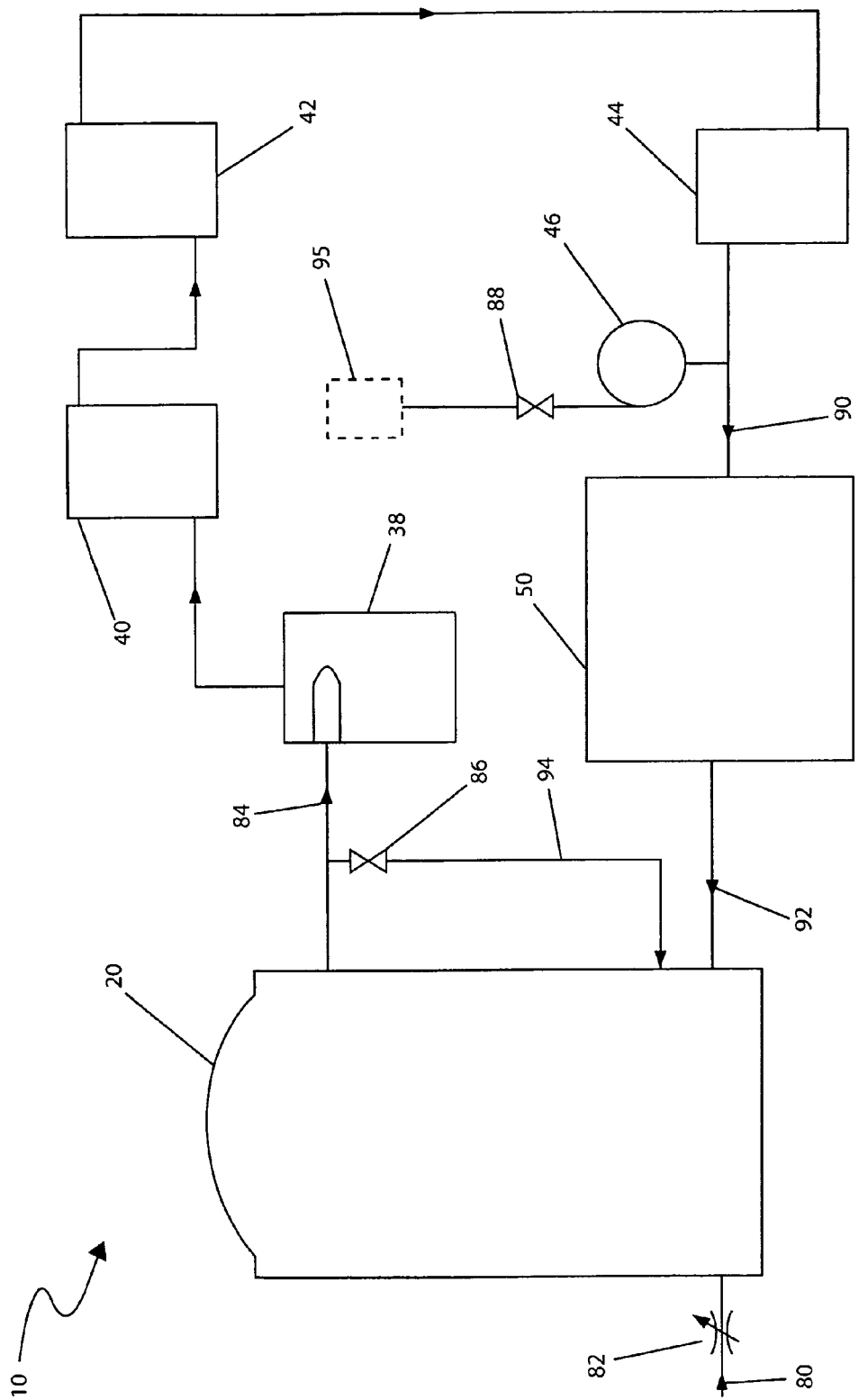
FIG. 1 is a process flow diagram of a method and system to utilize carbon dioxide ($CO_2$) and heat from flue or exhaust gas 10, according to a preferred embodiment of the present invention.

DESCRIPTIVE KEY 10 method and system to utilize carbon dioxide and heat from flue or exhaust gas
20 reactor
22 loading hatch
24 fuel
26 drying zone
27 process chamber
28 distillation zone
30 reduction zone
32 hearth zone
34 grate -continued 36 ash
38 cyclone
40 charcoal filter
42 oil filter
44 condensate accumulator
46 fan
50 power/heat generator
80 oxygen flow
82 oxygen flow regulator
84 synthetic gas flow
86 choke valve
88 synthetic gas regulator
90 purified synthetic gas flow
92 exhaust gas
94 bypass gas line
95 secondary gas usage
120 secondary reactor

DETAILED DESCRIPTION OF THE PREFERRED EMBODIMENT

Figure 2:
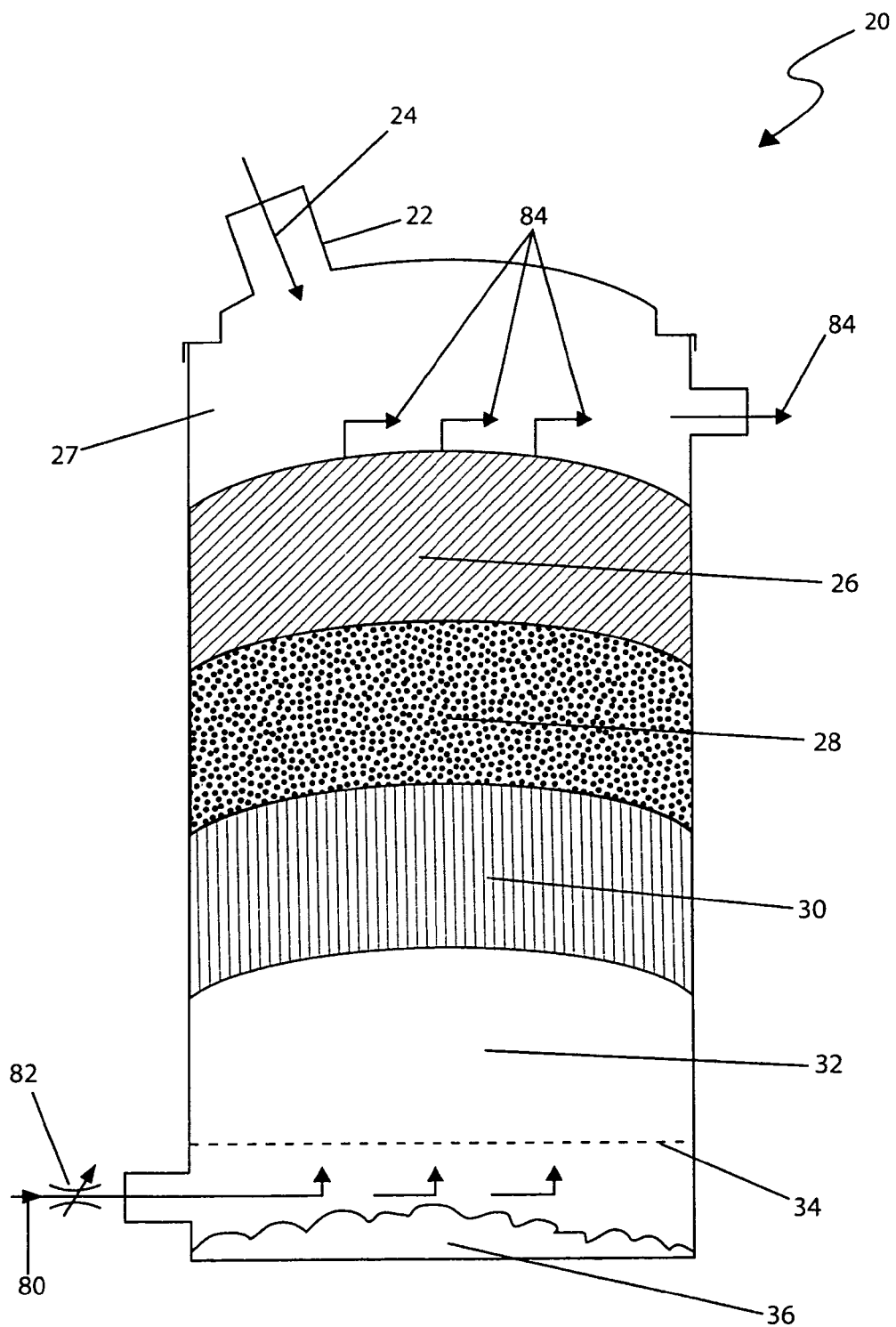
FIG. 2 is a cross-sectional view of a gasification reactor portion 20 of the method and system to utilize carbon dioxide and heat from flue or exhaust gas 10, according to a preferred embodiment of the present invention; and, FIG. 3 is a flow diagram depicting an alternate two (2) gasification reactor configuration, according to a preferred embodiment of the present invention.
Figure 3:
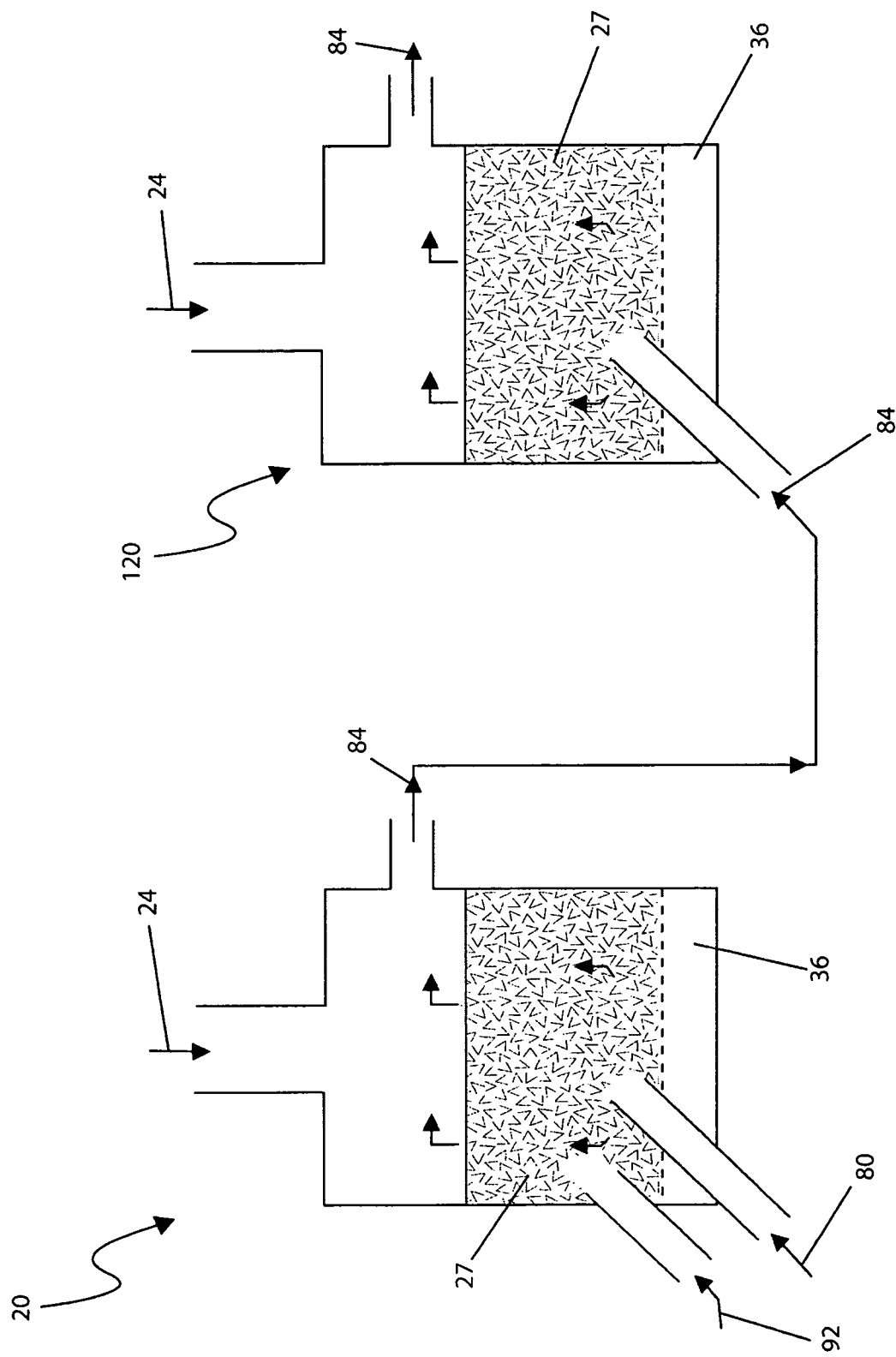

The best mode for carrying out the invention is presented in terms of its preferred embodiment, herein depicted within FIGS. 1 and 2 and alternately in FIG. 3. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a system to utilize carbon dioxide ($CO_2$) and heat from flue or exhaust gas (herein described as the "system") 10, which provides a thermochemical reaction of a heating value contained in coal or other biomass materials 24, and hot flue or exhaust gases 92 therefrom heat or power generators 50 to produce an economical and ecologically desirable synthetic gas 84. The system 10 utilizes a combination of heat having an elevated temperature therefrom exhaust or flue gases 92, which is produced therefrom a power or heat generator 50, and captured carbon fuel 24 therefrom sources such as, but not limited to: feedstock, coal, biomass, or the like, thereby achieving the thermochemical reaction and subsequently producing said synthetic gas 84. The high level energy contained therewithin the synthetic gas 84 may be utilized for increasing reaction rates and minimizing required amounts of feedstock fuel 24 when introduced thereinto a power/heat generator 50 or alternately introduced thereinto a secondary reactor 120 (see FIG. 3). The two primary zones of the process are the combustion zones therein a power/heat generator 50, and the thermochemical reaction zone therewithin the gasification reactor 10, which are integrated in combination therewith one another to recycle carbon dioxide into synthetic gas 84.

The gasification reactor converts $CO_2$ therefrom flue or exhaust gases 92 thereinto synthetic gas 84 by cracking and reforming the feedstock fuel 24. This is an endothermic reaction and occurs at temperatures typically in a temperature range above five hundred fifty degrees Celsius (550° C.). The reaction temperature is dependent on various things such as: different kinds of biomass fuel 24 being used, conversion efficiency, and a degree of coke or soot (carbon) formation. A portion of the feedstock fuel 24 can be combusted with oxygen in the flue stream to produce the required heat for the reaction. At these elevated temperatures, high thermal stresses can be created during the thermal cycling of the synthetic gas reactor.

The gasification process functions under an overall guidance of complementary, operational, and control strategies. One (1) control strategy comprises imposing general thermal control, based on extension of a maximum entropy principle, to optimize the system 10. Such a strategy comprises moderation of dynamic thermal extremes and the maintenance of suitable thermal energy balances. Another control strategy comprises controlling the flow of gas so as to optimize the covariance of all material and chemical exchanges among various components of the system 10 as a whole.

Referring now to FIG. 1, a process flow diagram of the system 10, according to the preferred embodiment of the present invention, is disclosed. Very hot flue or exhaust gas 92 containing $CO_2$ and running therefrom power or heat generators 50, passes therethrough piping to the gasification thermochemical reactor 20. Prepared feedstock fuel 24 is fed into the bubbling fluid-bed reactor 20, which is heated with flue or exhaust gas 92 having an absence of oxygen. To destroy oxygen, which is contained in flue gas, an entrance pipe containing flue gas from the reactor is directed into a hearth zone, whereby a combustion reaction between the feedstock fuel 24 and remaining flue gas oxygen produces additional amounts of $CO_2$. This reaction also raises the thermal energy. Flue or exhaust gases 92 then pass therethrough the feedstock fuel 24 which heats said feedstock fuel 24 to a temperature above five hundred fifty degrees (550° C.). A thermochemical reaction takes place between the $CO_2$ from the flue or exhaust gas 92 and the feedstock fuel 24, which are in the absence of oxygen, thereby converting said $CO_2$ into synthetic gas 84. The flow of synthetic gas 84 can be controlled by a choke valve 86. If sufficient energy is not obtained to produce a thermochemical reaction, the thermal energy therefrom the combusted feedstock fuel 24 is utilized in a conventional manner therewithin the gasification reactor 20 to reduce feedstock fuel 24 costs. Said combustion of the feedstock fuel 24 therewithin the gasification reactor 20 produces an additional amount of $CO_2$, which may also be converted into synthetic gas 84 by introducing it thereinto a hearth zone portion 32 of the reactor 20 via a bypass gas line 94. As illustrated here, said bypass gas line 94 routs said synthetic gas flow 84 thereto the hearth zone 32, thereby producing additional synthetic gas combustion therewithin said hearth zone 32 to increase a balance of energy. The bypass gas line 94 comprises a choke valve 86 providing a flow control means thereto said synthetic gas 84 as well as thermal control of the process. Control of the synthetic gas flow 84 is accomplished by a special regulator and a second part thereof may be used in a Fisher-Tropsh process to convert the carbon monoxide (CO) into hydrocarbons. Because the volume of the prepared CO after gasification is twice as large as that of the initial $CO_2$, and after combustion in the power generator, the volume of $CO_2$ remains twice as large as the initial $CO_2$. Stabilization of the process of converting $CO_2$ thereinto CO may be accomplished using either of these two (2) methods:

1. Divide the $CO_2$ into two (2) parts. Return one (1) part back to the reactor 20. The second part may be rejected thereto the atmosphere or kept in a carbon capture storage device. In this case, by using oxygen, it is not necessary to separate the $CO_2$ from nitrogen ($N_2$) and other gases by storing underground.

2. Produce twice as much CO therewithin the reactor 20 and return one (1) part thereto the power generator 50 and a second part may be used in a Fisher-Tropsh process to convert the CO into hydrocarbons. Due to the high temperature of the CO following gasification, said CO reduces the required additional energy for the thermochemical reaction in a similar manner as in South Africa which produces five (5) million tons of synthetic gasoline per year using this method.

Operation of the gasification reactor 20 in a continuous mode produces a steady flow of synthetic gas 84 allowing excess synthetic gas 84 to be introduced thereinto a heat or power generator 50 or to another synthetic gas-consuming device therewithin the system 10. Adding a flow of synthetic gas 84 thereto an intake portion of the gasification reactor 20, thereby utilizing the heating value therein the hearth zone portion 32 of the gasification reactor 20, reduces an amount of feedstock fuel 24 required for combustion. The synthetic gas reactor 20 and the associated control system is configured to adjust the flow rates of both the synthetic gas stream 84 and an oxidant stream supplied thereto the synthetic gas reactor 20 in order to operate said synthetic gas reactor 20.

The synthetic gas 84 produced therein the gasification process is not acceptably clean and must be purified using an acceptable means before using said synthetic gas 84 therein a power or heat generator 50, expansion generators, and other prime generators. The gasification reactor 20 comprises a cylindrical vessel further comprising output plumbing providing a connecting means thereto a gas cleaning system comprising a cyclone 38 where solid particles and charcoal are extracted therefrom. The gas cleaning system further comprises a charcoal filter 40, an oil filter 42, and a condensate accumulator 44. The clean synthetic gas 84 is then directed therethrough air cooled plumbing thereto either a secondary usage 95 or thereto the power and heat generator 50 as fuel to maintain process combustion. Delivery of the synthetic gas flow 84 thereto the secondary usage 95 is accomplished via a fan 46 and a synthetic gas regulator 88 to control a volumetric flow of said synthetic gas flow 84. Secondary usages 95 may include applications such as, but not limited to: a secondary power or heat generator, a synthetic petroleum producer, or the like. Starting the combustion process therein the power and heat generator 50 may be accomplished using conventional fuel, like natural gas.

The gasification reactor 20 comprises walls made using sheet iron being lined thereon outside and inside surfaces with special insulation. The reactor 20 comprises a feedstock fuel loading hatch 22 along a top surface. The loading hatch 22 comprises a hermetic seal during operation. The loading hatch 22 portion of the reactor 20 provides a moderately large opening, thereby accepting pieces of coal or biomass fuel 24 varying in size and moisture content. The feedstock fuel 24 forms a vertical column in which carbonization takes place thereat a bottom region and heat therefrom exhaust gases provides a drying means thereto said feedstock fuel 24 thereat an upper region. The feedstock fuel 24 can be replenished after operation.

The reactor 20 further comprises an active mixing means thereto flue or exhaust gas being introduced thereto the feedstock fuel 24, thereby significantly accelerating the thermochemical reaction. The intensity of said mixing is envisioned to be regulated using appropriate equipment. A damper-type oxygen flow regulator 82 located at a bottom portion of the reactor 20 is hermetically sealed during operation of the reactor 20.

Interruption of the gasification process results in a significant fuel penalty that will typically cause the overall efficiency of the whole system 10 to be unacceptably low, and the operating cost to be high. The use of an alternate secondary reactor 120 may be required to guarantee a continuous and steady flow of synthetic gas 84 thereto the power generator 50 to maintain said gasification process (see FIG. 3).

Referring now to FIG. 2, a cross-sectional view of a gasification reactor portion 20 of the system 10, according to the preferred embodiment of the present invention, is disclosed. The gasification reactor 20 comprises several zones including (from top to bottom), a drying zone 26, a process chamber 27, a distillation zone 28, a reduction zone 30, a hearth zone 32, a grate 34, and an ash bin 36. Said drying 26, distillation 28, and reduction zones 30 provide the thermochemical process enabling $CO_2$ to be converted into synthetic gas 84. The ash 36 and hearth zones 32 participate in all existing power and heat generators. The reactor 20 comprises two (2) parts. The first part provides combustion of coal or other carbonaceous materials to produce heat and $CO_2$ in the flue gas 92. The second part provides the thermochemical reaction where the $CO_2$ is converted thereinto synthetic gas 84, thereby retaining approximately ⅓ of the heat energy produced by the reactor 20. In reduction zone is occur reduction of oxygen and heat of feedstock occurs in the reduction zone 30 and vaporized water from the feedstock exists within the distillation zone 28.

An incidental byproduct of heat and power generators 50 is flue/exhaust gas having a temperature of six-hundred to eight-hundred degrees (600-800° C.) which has contributed to global climate change. In an effort to reduce an atmospheric emission of $CO_2$, the system 10 provides conversion of said $CO_2$ contained therein said flue or exhaust gases 92 thereinto synthetic gas 84 and subsequently introducing said synthetic gas 84 thereinto said generators 50, thereby eliminating escaping emissions.

The system 10 also provides conservation of residual heat energy therefrom said power/heat generators 50. $CO_2$ is currently produced as an industrial gas using a gasification reactor 20 which consumes coal or other feedstock fuel 24. Also, in some cases, said flue or exhaust gases 92 emit as much as seventy percent (70%) of contained combustion energy into the atmosphere. This system 10 allows this $CO_2$ and heat energy from said power generators 50, to be used directly therein a reactor 20 to produce synthetic gas 84, thereby providing environmental and financial benefits.

The proprietary shape of the reactor 20 produces negligible entrained particulate matter and promotes mixing of volatilized combustibles. Residence time of the biomass fuels 24 within the reactor 20 can be precisely controlled.

The reactor 20 provides low levels of particulate emissions. Feed stocks 24 containing moisture can be successfully converted to clean hot gas. Low particulate emissions plus the generally lower inorganic content of biomass fuels 24 translates into reduced emission of toxic materials and thermal energy.

Unloaded ash material 36 generated in the reactor 20 can contain a chemical composition which will make it suitable for commercial use. Said ash 36 may be mixed with a variety of other inorganic materials such as sand, clay, gravel, etc. to produce a variety of different soils useful in agriculture, landscaping, forestry, and other ecological applications. Also, said ash 36 used in combination therewith a joule heated vitrification unit can convert the ash 36 formed in the reactor 20 into glass.

Referring now to FIG. 3, a flow diagram depicting an alternate two (2) gasification reactor configuration, according to an alternate embodiment of the present invention, is disclosed. Interruption of the gasification process therewithin the reactor 20 results in a significant fuel usage penalty which will typically cause the overall efficiency of the system 10 to be unacceptably low, and corresponding operating costs to be too high. The use of an alternate secondary reactor 120 may be required to guarantee a steady flow of synthetic gas 84 thereto the power generator 50 to sustain a temperature of said power generator 50, thereby allowing rapid restarting of said power generator 50 when the first reactor 20 is stopped for charcoal unloading, ash unloading, and/or loading of new feedstock fuel 24. The output of the hot synthetic gas 84 provides heat which may be used to maintain the second reactor 120 at a near-operating temperature.

In operation, the synthetic gas 84 passes into the second reactor 120 to preheat the feedstock fuel 24. The preheating of said feedstock fuel 24 before starting the second reactor 120 provides utilization of safe energy as well as increasing an efficiency of the system 10.

The process functions under overall guidance of complementary, operational control strategies. Said controls are based on natural principles when all the feedstock fuel 24 is under the thermochemical reaction, transforming said feedstock fuel 24 thereinto charcoal, thereby producing exhaust gases 92 which are converted into synthetic gas 84. This process occurs very slowly and slowly reduces a temperature therein a hot generator 50. A temperature reduction of five to fifteen percent (5-15%) is envisioned to initiate a signaling device, thereby indicating a need to unload charcoal therefrom the reactor 20 and fill said reactor 20 with new feedstock fuel 24. During short periods of time such as when unloading charcoal and loading feedstock fuel 24, a conventional fuel such as natural gas may be used. To provide a continuous process, a second reactor 120 is required and exhausts gases 92 directed thereinto the second reactor 120. During a period of downtime, charcoal and ash is unloaded from the first reactor 20 and new feedstock fuel 24 is loaded.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be constructed and utilized by qualified technologists as indicated in FIGS. 1 through 3.

The method of utilizing the system 10 may be achieved by performing the following steps: starting a thermochemical reaction therewithin a gasification reactor 20 by loading an appropriate volume of coal or other biomass fuel 24 thereinto; introducing hot flue or exhaust gases 92 therefrom a heat or power generator 50 being oxygen poor and $CO_2$ rich and having a temperature range above five-hundred fifty degrees (550° C.) thereinto said reactor 20 to produce a synthetic gas 84; utilizing the high level energy contained therewithin the synthetic gas 84 to increase reaction rates and minimize required amounts of feedstock 24 normally consumed by a conventional power/heat generator 50.

The utilization of the alternate two (2) gasification reactor configuration is designed to avoid interruption of the gasification process therewithin the reactor 20, thereby guaranteeing a steady flow of synthetic gas 84 thereto the power generator 50 to sustain a temperature of said power generator 50, thereby allowing rapid restarting of said power generator 50 when the first reactor 20 is stopped for charcoal unloading, ash unloading, and/or loading of new feedstock fuel 24. The output of the hot synthetic gas 84 provides heat which may be used to maintain the second reactor 120 at a near-operating temperature. In operation, the synthetic gas 84 passes into the second reactor 120 to preheat the feedstock fuel 24. The preheating of said feedstock fuel 24 before starting the second reactor 120 provides utilization of safe energy as well as increasing an efficiency of the system 10.

The gasification process functions of both the preferred and alternate embodiments of the system 10 are envisioned to be under an overall guidance of complementary, operational, and control strategies such as, but not limited to: imposing general thermal control based on extension of a maximum entropy principle to optimize the system. Such a strategy comprises moderation of dynamic thermal extremes and the maintenance of suitable thermal energy balances. Another control strategy comprises controlling the flow of gas so as to optimize the covariance of all material and chemical exchanges among various components of the system 10 as a whole.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A method of utilizing carbon dioxide and waste heat contained in flue or exhaust gas therefrom a generator within at least one (1) gasification reactor to produce a synthetic gas, said method further comprising:
    providing a process for producing said synthetic gas, said process comprising:
    capturing said flue or exhaust gas therefrom said at least one (1) gasification reactor;
    supplying said gasification reactor therewith said flue or exhaust gas;
    controlling an amount of said flue or exhaust gas supplied thereto said at least one (1) gasification reactor;
    supplying an oxidant thereto said at least one (1) gasification reactor, said oxidant being pure oxygen;
    controlling an amount of said oxidant thereto said at least one (1) gasification reactor;
    recycling said waste heat to provide thermal energy thereto said at least one (1) gasification reactor;
    inducing a thermochemical reaction therebetween said carbon dioxide and a feedstock therein said at least one (1) gasification reactor, thereby producing said synthetic gas;
    cleaning said synthetic gas; and,
    collecting said synthetic gas for subsequent use;
    providing carbon dioxide recovery technology further comprising said at least one (1) gasification reactor for generating said synthetic gas;
    utilizing said waste heat from said flue or exhaust gas therethrough said thermal energy exchange with said feedstock therein said at least one (1) gasification reactor;
    sustaining an operating temperature of said at least one (1) gasification reactor within a desired temperature range, wherein operation is allowed convert said carbon dioxide into said synthetic gas by increasing a reaction efficiency of said thermochemical reaction;
    reducing greenhouse gases produced therein said generator through subsequent process thereof said flue or exhaust gas;
    combating with global warming therewith said method;
    providing commercial products and reducing waste products therewith said method; and,
    providing a reduction of dependence thereof fossil fuels.

2. The method of claim 1, further comprising the step of recycling said synthetic gas back into said generator.

3. The method of claim 1, further comprising the step of utilization of oxygen as said oxidant therein said generator and said at least one (1) gasification reactor;
    wherein said oxygen combusts therewith said feedstock therein said at least one (1) gasification reactor; and
    wherein said utilization of oxygen significantly increases the flow rate thereof said carbon dioxide and doubles a heat value thereof said synthetic gas.

4. The method of claim 1, further comprising the step of operating said method continuously concurrent with operation thereof said generator.

5. The method of claim 1, further comprising the step of sustaining said temperature range within at least five hundred fifty degrees Celsius (550° C.).

6. The method of claim 1, further comprising the step of routing a slipstream thereof said synthetic gas produced by said at least one (1) gasification reactor thereto said at least one (1) gasification reactor to increase thermal energy exchange;
    wherein said step of routing said slipstream thereof said synthetic gas increases a temperature thereof said thermochemical reaction.

7. The method of claim 1, further comprising the step of routing a slipstream thereof said synthetic gas produce by said at least one (1) gasification reactor to preheat said feedstock.

8. The method of claim 1, further comprising the steps of capturing said flue or exhaust gas from a second generator.

9. The method of claim 8, wherein said generator is a prime power generator.

10. The method of claim 8, wherein said generator is an expansion generator.

11. The method of claim 1, wherein said feedstock comprises at least one (1) carbonaceous material from the list containing: wood fractions, coal, and biomass.

12. The method of claim 1, wherein said step of cleaning said synthetic gas further comprises the step of:
    extracting any entrained solid particles therewith a gas cleaning system, further comprising a cyclone, a charcoal filter, an oil filter, and a condensate accumulator to produce a clean synthetic gas.

13. The method of claim 1, wherein said step of collecting said synthetic gas for subsequent use further comprises the step of:
    directing said clean synthetic gas therethrough air cooled plumbing therewith a fan and a synthetic gas regulator to control a volumetric flow of said clean synthetic gas flow.

* * * * *